US012626294B2

(12) United States Patent
    Tu et al.

(10) Patent No.:     US 12,626,294 B2
(45) Date of Patent:        May 12, 2026

(54) SYSTEMS AND METHODS FOR AUTONOMOUS CONVERSATIONAL ORDERING AND BOOKING USING AI TECHNOLOGIES

(71) Applicants: Harry Tu, Pleasanton, CA (US); Wei Zhu, Beijing (CN)

(72) Inventors:  Harry Tu, Pleasanton, CA (US); Wei Zhu, Beijing (CN)

( * )  Notice:     Subject to any disclaimer, the term of this patent is extended or adjusted under 35 U.S.C. 154(b) by 114 days.

(21) Appl. No.: 18/400,619

(22) Filed:       Dec. 29, 2023

(65)               Prior Publication Data

US 2025/0095039 A1      Mar. 20, 2025

Related U.S. Application Data

(60) Provisional application No. 63/584,080, filed on Sep. 20, 2023.

(51) Int. Cl.
     *G06Q 30/0601*        (2023.01)
     *G06F 40/40*          (2020.01)
                (Continued)
(52) U.S. Cl.
     CPC ......... *G06Q 30/0633* (2013.01); *G06F 40/40* (2020.01); *G06Q 50/12* (2013.01); *H04L 51/02* (2013.01)
(58) Field of Classification Search
     CPC ................. G06Q 30/01; G06Q 30/012; G06Q 30/015–016; G06Q 30/0601–06444;
                (Continued)

(56)                References Cited

U.S. PATENT DOCUMENTS 9,626,703 B2 *   4/2017   Kennewick, Sr. ...........................
                                                    G06Q 30/0601
    12,131,394 B1 *  10/2024  Pokkunuri ............. G06N 20/00
                     (Continued)

OTHER PUBLICATIONS

AI Chains: Transparent and Controllable Human-AI Interaction by Chaining Large Language Model Prompts. [Submitted on Oct. 4, 2021, last revised Mar. 17, 2022]. Tongshuang Wu, Michael Terry, Carrie J. Cai. https://doi.org/10.48550/arXiv.2110.01691 (Year: 2022).*
                     (Continued)

*Primary Examiner* — William J Allen
(74) *Attorney, Agent, or Firm* — Fish & Richardson P.C.

(57)                ABSTRACT

The present disclosure relates to systems, software, and computer-implemented methods for autonomous conversational ordering using AI technologies. An example method includes receiving one or more input messages from a user via a dialogue user interface (UI). The method further includes generating, by a first large language model (LLM), one or more output messages based on the one or more input messages and information of a provider. The method further includes transmitting the one or more output messages to the user via the dialogue UI. The method further includes determining, by a second LLM, that the user has submitted a request associated with an order with the provider. The method further includes generating a description of the request in a format in compliance with an order processing system of the provider and transmitting the description to the order processing system.

20 Claims, 10 Drawing Sheets

| Customer 102 | Primary LLM 108a | Secondary LLM 108b |
|---|---|---|
| 202 Transmit 1st input message | 204 Receive 1st input msg | 216 Monitor conversation |
| | 205 Generate 1st output msg | |
| 208 Receive 1st output msg | 206 Transmit 1st output msg | |
| ... | ... | |
| 210 Transmit n-th input msg | 212 Receive n-th input msg | |
| | 213 Generate n-th output msg | |
| 215 Receive n-th output msg | 214 Transmit n-th output msg | 218 Determine a request associated with an order |
| | 222 Generate a description of the request | 220 Notify primary LLM 108a the request |

200

(51) Int. Cl.
    *G06Q 50/12*        (2012.01)
    *H04L 51/02*        (2022.01)
(58) Field of Classification Search
    CPC .............. G06F 40/20–35; H04L 51/02; H04L
                                    51/04–046
    See application file for complete search history.

(56)                 References Cited

U.S. PATENT DOCUMENTS

| | | | |
|---|---|---|---|
| 2012/0066008 A1* | 3/2012 | Scudder ................. | G06Q 40/08 705/4 |
| 2013/0275164 A1* | 10/2013 | Gruber ............... | G06F 16/2457 705/5 |
| 2015/0066479 A1* | 3/2015 | Pasupalak ......... | G06F 16/90332 704/9 |
| 2020/0042606 A1* | 2/2020 | Ben-Ishay ............. | G06F 40/134 |
| 2020/0125919 A1* | 4/2020 | Liu .................... | G06Q 30/0617 |
| 2022/0374956 A1* | 11/2022 | Jungmeisteris ....... | G06F 3/0482 |
| 2024/0388551 A1* | 11/2024 | AlFardan .............. | H04L 51/212 |
| 2024/0428020 A1* | 12/2024 | Wu .......................... | G10L 21/00 |
| 2025/0061491 A1* | 2/2025 | Ahmad-Taylor ........................... G06Q 30/0271 |
| 2025/0147956 A1* | 5/2025 | Payani .............. | G06F 16/24522 |
| 2025/0173606 A1* | 5/2025 | Dearing ............... | G06F 40/279 |
| 2025/0190466 A1* | 6/2025 | Barros ................. | G06F 40/289 |

OTHER PUBLICATIONS

Weizhi Wang, Zhirui Zhang, Junliang Guo, Yinpei Dai, Boxing Chen, and Weihua Luo. 2022. Task-Oriented Dialogue System as Natural Language Generation. Association for Computing Machinery, New York, NY, USA, 2698-2703. https://doi.org/10.1145/3477495.3531920 (Year: 2022).*
Sang-Woo Lee, et al. Can Current Task-oriented Dialogue Models Automate Real-world Scenarios in the Wild?. Originally submitted Dec. 20, 2022, revised on May 24, 2023. https://doi.org/10.48550/arXiv.2212.10504. (Year: 2023).*

* cited by examiner

From FIG. 2A

200

SYSTEMS AND METHODS FOR AUTONOMOUS CONVERSATIONAL ORDERING AND BOOKING USING AI TECHNOLOGIES

CROSS-REFERENCE TO RELATED APPLICATIONS

This application claims the benefit of U.S. Provisional Application Ser. No. 63/584,080 filed on Sep. 20, 2023, the entire contents of which are hereby incorporated by reference in its entirety.

TECHNICAL FIELD

The present disclosure generally relates to artificial intelligence (AI).

BACKGROUND

Restaurants, hotel, food & beverage venues, retail shops, and other consumer service-oriented establishments can have a high volume of repetitive work involving customer services and fulfillments. Such work is often times error-prone. Service delays and mistakes can contribute to customer dissatisfactions and thus can affect business growth. In addition, such daily overload of mission critical work duties can burden employees with stress and increase operational costs for the business.

SUMMARY

The present disclosure involves systems, software, and computer-implemented methods for autonomous conversational ordering and booking using AI technologies. An example method performed by one or more computers includes receiving one or more input messages from a user via a dialogue user interface (UI). The method further includes generating, by a first large language model (LLM), one or more output messages based on the one or more input messages and information of a provider. The method further includes transmitting the one or more output messages to the user via the dialogue UI. The method further includes based on the one or more input messages and the one or more output messages, determining, by a second LLM, that the user has submitted a request associated with an order with the provider. The method further includes generating a description of the request in a format in compliance with an order processing system of the provider. The method further includes transmitting the description to the order processing system.

In some instances, the method further includes validating the format of the description by communicating with the order processing system. In some of those instances, the dialogue UI includes a chat box window and an order preview window that are configured to interact with each other, and the one or more input messages and the one or more output messages are presented in the chat box window. In some of those instances, the method further includes: presenting, via the order preview window, contents of the description in a structured format to the user; receiving feedback from the user on the contents of the description through at least one of the chat box window or the order preview window; and validating the contents of the description based on the feedback. In some of those instances, the format of the description and the contents of the description are validated by a third LLM.

In some instances, the request includes one or more of: a request from the user to place a new order with the provider; a request from the user to modify an existing order the user placed with the provider previously; or a request from the user to cancel the existing order.

In some instances, the order includes one or more of: an order for a good being sold by the provider; or an order for a service being provided by the provider.

In some instances, each of the one or more input messages and the one or more output messages is either a natural language text message or a natural language voice message.

In some instances, the information is stored in a local knowledge database that is accessible to the first LLM, and the information includes one or more of: contact information of the provider; an introduction to the provider; a list of products sold by the provider; a product description; availability information of services provided by the provider; marketing information; or information of users of the provider. In some of those instances, the one or more input messages and the one or more output messages are in a first natural language, and the information is stored in the local knowledge database in a second natural language. In some of those instances, the method further includes generating the information in the first natural language and storing the information in the first natural language in a second local knowledge database that is accessible to the first LLM.

In some instances, the first LLM is a public LLM, and the second LLM is a private LLM trained using training data associated with the information of the provider.

An example system includes one or more computers and one or more storage devices storing instructions that when executed by the one or more computers cause the one or more computers to perform operations. The operations include receiving one or more input messages from a user via a dialogue UI. The operations further include generating, by a first LLM, one or more output messages based on the one or more input messages and information of a provider. The operations further include transmitting the one or more output messages to the user via the dialogue UI. The operations further include based on the one or more input messages and the one or more output messages, determining, by a second LLM, that the user has submitted a request associated with an order with the provider. The operations further include generating a description of the request in a format in compliance with an order processing system of the provider. The operations further include transmitting the description to the order processing system.

In some instances, the operations further include validating the format of the description by communicating with the order processing system. In some of those instances, the dialogue UI includes a chat box window and an order preview window that are configured to interact with each other, and the one or more input messages and the one or more output messages are presented in the chat box window. In some of those instances, the operations further include: presenting, via the order preview window, contents of the description in a structured format to the user; receiving feedback from the user on the contents of the description through at least one of the chat box window or the order preview window; and validating the contents of the description based on the feedback. In some of those instances, the format of the description and the contents of the description are validated by a third LLM.

In some instances, the request includes one or more of: a request from the user to place a new order with the provider; a request from the user to modify an existing order the user placed with the provider previously; or a request from the user to cancel the existing order.

In some instances, the order includes one or more of: an order for a good being sold by the provider; or an order for a service being provided by the provider.

In some instances, each of the one or more input messages and the one or more output messages is either a natural language text message or a natural language voice message.

In some instances, the information is stored in a local knowledge database that is accessible to the first LLM, and the information includes one or more of: contact information of the provider; an introduction to the provider; a list of products sold by the provider; a product description; availability information of services provided by the provider; marketing information; or information of users of the provider. In some of those instances, the one or more input messages and the one or more output messages are in a first natural language, and the information is stored in the local knowledge database in a second natural language. In some of those instances, the method further includes generating the information in the first natural language and storing the information in the first natural language in a second local knowledge database that is accessible to the first LLM.

One or more example non-transitory computer-readable storage media can store instructions that when executed by one or more computers cause the one or more computers to perform operations. The operations include receiving one or more input messages from a user via a dialogue UI. The operations further include generating, by a first LLM, one or more output messages based on the one or more input messages and information of a provider. The operations further include transmitting the one or more output messages to the user via the dialogue UI. The operations further include based on the one or more input messages and the one or more output messages, determining, by a second LLM, that the user has submitted a request associated with an order with the provider. The operations further include generating a description of the request in a format in compliance with an order processing system of the provider. The operations further include transmitting the description to the order processing system.

DETAILED DESCRIPTION

Figure 1:
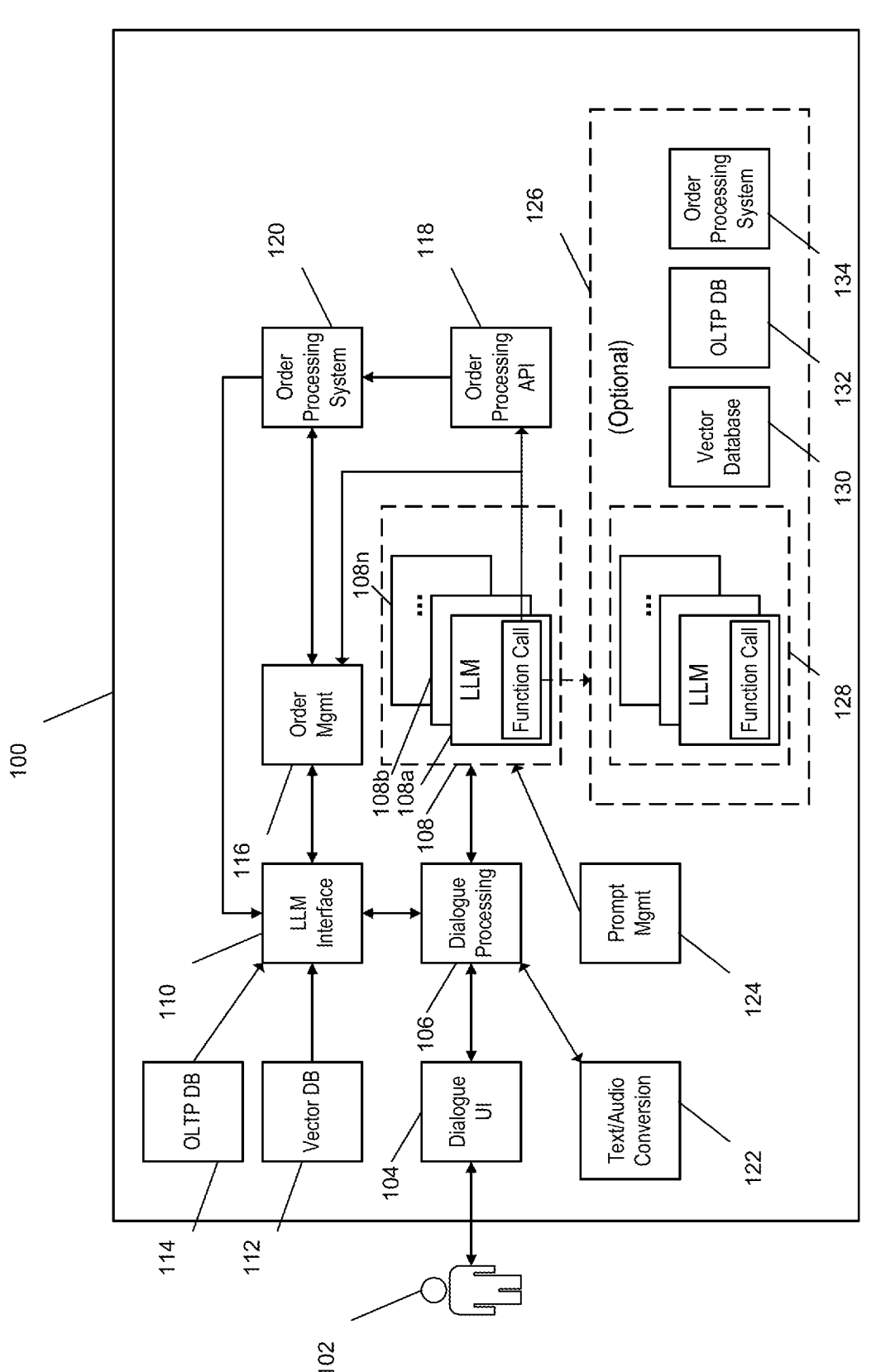
FIG. 1 illustrates an example system for performing the subject matter described herein, according to some aspects of the present disclosure.

It is desired that repetitive customer service and fulfillment work duties are delegated to an intelligent machine for which it can autonomously and naturally converse with customers just like a human. It can understand the needs or actions of customers, while delivering the expected customer intent (including but not limited to information, ordering, reservations, scheduling, and other structured business transactions) without human intervention and can be scalable and performant without adding labor resource cost to the mix.

Such a technique would reduce or eliminate the error-prone process of overloaded and short-staffed human actor alternative, while empowering business establishments to service its customers expediently. With such a technique, the customers' needs can be accomplished in the same manner and experience that a customer would have enjoyed interacting with a human agent traditionally.

Although current computer and traditional artificial intelligence (AI) techniques are quite sophisticated, it can still be difficult to substitute human actors (who performs natural conversational customer service and business fulfillment such as ordering, reservations, and scheduling) with computers or traditional AI systems to act as a natural conversational smart agent without human intervention.

In the design of AI, computer scientists have focused on the ability to have fluent and natural conversations like humans. Turing, the proposer of artificial intelligence concept, created the "Turing Test" to evaluate the ability of artificial intelligence to engage in conversations. However, traditional computer technologies and prior to Large Language AI Models have difficulties to achieve complete autonomous conversational intelligence without human intervention. Although there have been many products similar to Siri and Alexa, their capabilities are far from real intelligent conversations that can lead to a strict and committed business transaction end result.

With the emergence of large language model (LLM) like generative pre-trained transformers (GPT) and Large Language Model Meta AI (LLaMA), with parameters of up to hundreds of billions and training data reaching trillions, they surpass previous AI technologies in conversational capabilities and essentially achieve intelligent and natural conversations with its users. Based on such LLMs, it is possible to endeavor the development of domain knowledge specific commercial AI service products. However, mature, LLM based AI agent techniques in the restaurant, hospitality, and retail industries for the purpose of autonomously committing orders, reservations, and scheduling through natural conversations are still desired.

Large Language AI Models can achieve intelligent conversations with users but may not take orders, reservations, or schedules, and commit to a strict business transactional structure. The problem to be addressed is how to transform dialogue (natural verbal or written conversations between the customer and the AI agent) into actual orders, reservations, and schedules to be committed into the underlying business system.

Large language AI models can handle conversations and extract order, reservation, and schedule data from conversation, however, these interactions are casual and do not represent a strict and conformed business transaction end result. In other words, Large Language AI models can extract order, reservation, and schedule content, but it would be lost in term of how to transform such data into a structured business data that the underlying business system expects. This is analogous to a human taking order, reservation, or schedule via conversation and inputting into the underlying business system in a structured manner. The art in this missing link contributes to the inability of Large Language AI models to achieve business specific domain expertise and transactional commitment.

In addition, users may face challenges in conducting conversations when they use different human language types, especially when the human language restrictions in the merchant's database limit the human language they can use for placing orders, make reservations, or book schedules, even though LLM supports multi-language capability.

In summary, there is a lack of smart solutions on how to convert natural conversations into formal business operations and transactions, with a complete and autonomous approach without human intervention. Specifically, there lacks a multilingual and comprehensive approach to autonomously automate systems for services, orders, reservations, scheduling in places like restaurants, hotels, and retail establishments through natural conversations all handled via AI agent services.

In order to solve the current lack of AI agent capable of transforming natural conversations into strict and structured business operations and transactions for the restaurant, hospitality, and retail industries, the present disclosure provides a comprehensive technique to implement AI service for restaurants, hotels, and retail shops, that enables natural and multilingual capable conversations between the customer and AI agent, and autonomously transform such conversation into actual orders, reservations, and schedules, and commit into the underlying business system as what a human operator would have done.

The AI service disclosed herein to handle order, reservation, and scheduling systems in establishments such as restaurants, hotels, and retail stores is based on the intelligence and capabilities of LLMs in the AI field.

The AI service technique can use LLMs to enable intelligent and autonomous services, including understanding user semantics, processing business domain knowledge, analyzing conversation memory, handling conversation logic, and extracting relevant information from dialogues. It can replace human interventions and provide complete autonomous business services through natural conversations.

The present disclosure provides a feasible technique using the AI prompts of LLMs in combination with knowledge corpus vectors and relational databases, to provide users with relatively accurate and natural conversational services regarding business knowledge and transactional commitment.

By utilizing the general conversational intelligence of LLMs, techniques disclosed herein can organize user orders, reservations, and schedules from conversations. Based on the intent analysis of users using LLMs, judgments can be made on order, reservation, and schedule data, and the "function call" feature of LLMs can be used to submit structured orders, reservations, and schedules to a database.

The present disclosure provides a dialogue input box and order/reservation/schedule preview panel. The dialogue input box is responsible for the conversation, while the order/reservation/schedule preview panel handles formatted data, mainly for orders, reservations, and schedules. There can be real-time interaction between the dialogue input box and the order/reservation/schedule preview panel.

The present disclosure provides a series of rules to validate the orders, reservations, and schedules, organized by the LLM from conversations.

By leveraging the multi-language conversational capabilities of the LLM, a real-time translation mechanism has been designed to handle formatted data in the merchant's local database, ensuring consistency with the human language used by the user.

The emergence of LLMs like GPT and LLAMA have greatly improved the conversational intelligence of AI, enabling smooth communication and understanding of human languages and intentions. These models can provide knowledgeable answers to humans. This opens the door for AI to replace service operations currently manned by humans, which is a significant efficiency opportunity and a technological advancement for the service industry such as restaurants, hotels, and retail shops.

However, the current LLMs still have limitations in meeting the needs of serving customers. Moreover, it is noted that LLMs are based on "neural network" technology, and their conversations are inherently informal, which may contain unintended expectations and errors. Therefore, in order to successfully apply LLMs to the service industry, a sound technological design is required. Techniques provided in this disclosure can provide autonomous multilingual system for services, orders, reservations, and schedules in places like restaurants, hotels, and retail establishments, thereby meeting the application needs of the service industry.

FIG. 1 illustrates an example system 100 for performing the subject matter described herein, according to some aspects of the present disclosure. A dialogue user interface (UI) 104 can be a human-computer dialogue interface. Dialogue UI 104 serves as a platform for one or more customers (also referred to as users) to engage in conversations with system 100. In some implementations, dialogue UI 104 can be used for dialogues and interactions between the customer and system 100 and can allow the customer to transmit input text messages and/or input voice messages to system 100 and to receive output text messages and/or output voice messages from system 100, enabling natural language (e.g., English) conversations. In some implementations, dialogue UI 104 can include a chat box window on a web page or various client programs such as chat boxes in mobile applications. In some implementations, dialogue UI 104 includes a conversation initiated through a telephone call. Furthermore, dialogue UI 104 can include an order preview window (also referred to as an order preview panel), which displays captured order information from the chat box window and allows the customer to perform predefined actions on the order preview window.

A dialogue processing module 106 is configured to handle intermediate processing of input messages from dialogue UI 104 and to transmit response (e.g., output messages from LLM 108a) to the customer. In some implementations, dialogue processing module 106 can be integrated with a LLM interface module 110 to process various types of private knowledge simultaneously.

A text/speech conversion model 122 can be configured to convert speech inputs from the customer into text, as well as to convert a text response generated by system 100 into speech.

System 100 includes an AI module 108. AI module 108 can include one or more LLMs 108a, 108b, . . . , and 108n. LLM 108a can be referred to as a primary LLM and can serve as an intelligent engine of system 100. LLM 108*b* can be referred to as a secondary LLM. Primary LLM 108*a* can be a commercial model (e.g., Chat Generative Pre-trained Transformer (ChatGPT)) or an open-source model (e.g., Large Language Model Meta AI (LLaMA)). ChatGPT can utilize application programming interface (API) connections, eliminating the need for private deployment, while LLaMA can be deployed locally. In some instances, these LLMs can be sourced from model providers and contain public knowledge from around the world, eliminating the need for retraining. The other LLMs in AI module 108 can be similar to or the same as primary LLM 108*a* and can take different tasks.

Tasks of primary LLM 108*a* include at least a combination of the following: engaging in conversations with the customer, analyzing and generating order information from the conversations, generating agreed-upon JSON formatted orders from the captured order data, using a function call 109 to invoke an order generation feature, engaging in conversation with an order management module 116, or obtaining proprietary/private business knowledge by conversing with a LLM interface module 110. Primary LLM 108*a* also can manage merchant's store information, product information, availability information, introduce products and services to the customer, accept the customer's order requests, and organize orders (including reservations and schedules).

Function call 109 is a feature of primary LLM 108*a* that allows primary LLM 108*a* to output structured data. Primary LLM 108*a* can use function call 109 to captures a formatted order from the dialogue or conversation with the customer. Specifically, primary LLM 108*a* can analyze order related information from the conversation, generate an order in a suitable format (e.g., JavaScript Object Notation (JSON)), and pass the order to either an order processing API 118 API or order management module 116.

Secondary LLM 108*b* can monitor the conversation between primary LLM 108*a* and the customer. Secondary LLM 108*b* can determine whether the customer has submitted a request associated with an order based on the conversation. If such an intent is determined, secondary LLM 108*b* can inform dialogue processing module 106, which then notifies primary LLM 108*a*, thereby triggering primary LLM 108*a* to extract order data from the conversation and to make an order related function call (e.g., through function call 109). In some implementations, secondary LLM 108*b* can be replaced with some other privately trained machine learning models which are configured to perform functions similar to those performed by secondary LLM 108*b*. In some implementations, the request associated with the order can be determined using a rule-based algorithm (e.g., a keyword matching program). In some implementations, the request can be determined by primary LLM 108*a*.

In the present disclosure, an order can refer to an order for a good being sold by a merchant (also referred to as a provider) or a service being provided by the merchant. For example, the customer can submit an order to schedule a service or make a reservation. The request submitted by the customer can be a request to place a new order with the merchant, to modify an existing order the customer placed with the merchant previously, to cancel the existing order, or any combination thereof. For example, the customer can submit an order to purchase a list of products from a grocery store. In some instances, the customer can order takeout food from a restaurant. In some other instances, the customer can submit an order to a restaurant to reserve a table from the restaurant or to change or cancel a previous reservation. It should be noted that the reservation described herein is not limited to table reservations. The reservation can refer to any appointments, scheduling, or booking related to a service industry. In some implementations, a reservation includes booking a hair salon appointment, a service shop or store appointment (e.g., a car service reservation, or a Genius Bar reservation with Apple customer support), or a business appointment, etc. In some implementations, a reservation includes employee work scheduling.

It is understood that any suitable number of LLMs (e.g., LLMs 108*a*-108*n*) can be included in AI module 108, depending on task allocation. In some implementations, AI module 108 can include another LLM (e.g., LLM 108*n*) that can compare and validate order data in order management module 116 with order data displayed to the customer by primary LLM 108*a*. If LLM 108*n* identifies any inconsistencies, corrections can be made to the order according to some rules.

More LLMs can also be included in AI module 108 and can be used to further segment the functionalities of a given task, thereby achieving better results. It should be noted that the aforementioned LLMs can either be a single LLM called by different processes or separate LLMs called individually. In some implementations, each of LLMs 108*a*-108*n* can be connected through the GPT Application Programming Interface (API) or deployed locally as a private instance using open-source LLMs such as LLaMA. It should be understood that the allocation of various tasks among several LLM can be changed in practice and is not limited to the example described above. In some implementations, the task allocation can be based on experimental results.

When using these LLMs, different "Prompts" can be used to command each of these LLMs to perform different tasks. The "Prompts" can be pre-set and pre-stored in a file or a prompt management database 124 and can be sent to the LLMs when being called. It should be noted that the "Prompts" may also contain data that is dynamically retrieved from a database or file through a program.

LLM interface module 110 can be a component platform developed to support LLMs. LLM interface module 110 can be a customized interface. LLM interface module 110 can include a variety of LLM APIs. In some implementations, as shown in FIG. 1, LLM interface module 110 can be configured to incorporate a vector database 112. LLM interface module 110 can be included for the purpose of development convenience. In some implementations, LLM interface module 110 can be developed using open source tools such as "LangChain." In some implementations, LLM interface module 110 is optional. If LLM interface module 110 is not included in system 100, then some of the aforementioned tasks of LLM interface module 110 can be undertaken by dialogue processing module 106, or other suitable modules or components in system 100.

In a conversation, when a customer asks a question related to the merchant, the question is passed to primary LLM 108*a* for processing. Primary LLM 108*a* can generate a response based on the customer's question and business knowledge associated with the merchant. In some implementations, the business knowledge associated with the merchant can be directly provided to primary LLM 108*a* for processing. In some implementations, some of the business knowledge (including but not limited to contact information, historical information, business descriptions, product information, and availability information) can be private knowledge that the merchant may not want to enter a LLM (e.g., by training and/or fine-tuning the LLM) for privacy reason or some other business-related reasons.

Private knowledge can be stored in vector database 112 and Online Transaction Processing (OLTP) database 114, and can be called upon by LLMs in AI module 108. Private knowledge can include large chunks of natural language text. Such information can be processed by the LLMs to generate embedding vectors, which are then stored in vector database 112. OLTP database 114 (also referred to as a relational database) can be an existing system used by the merchant, such as a product, customer relationship management (CRM), point of sale (POS), or other business database. Keywords and Term Frequency Inverse Document Frequency (TF-IDF) values of product and services availability information can be stored in OLTP database 114. The LLMs can access OLTP database 114 through API to retrieve product, services, availability, and other related information as needed.

Order management module 116 can handle order related data captured by a LLM (e.g., primary LLM 108a and secondary LLM 108b) from the conversation, ensuring that the data is formatted and accurate, as well as conforming to the underlying business system for which is expected to commit such data. This data is then presented in the order preview window within dialogue UI 104 to the customer. The customer can interact with and manipulate the order through the order preview window.

An order processing system 120 can be a commercial system used by the merchant to process orders or other order-related transactions and store the processed orders and/or transactions. Order processing system 120 can be a separate and exterior system (e.g., a POS system) operated by the merchant. In some implementations, as shown in FIG. 1, order processing system 120 can be integrated into system 100.

An order processing API 118 can be an interface that interconnects with other modules (e.g., AI module 108) of system 100 and allows the other modules to submit an order to order processing system 120.

The structure of system 100 and techniques described with respect to figures in the present disclosure are for illustration purposes only and can be readily modified and/or adapted for various applications. For example, techniques in the present disclosure also support multi-layer (e.g., more than two layers) merchant structures. The present disclosure can cover a dual-layer or multi-layer merchant structure, where the first layer represents a large platform, and the second layer consists of multiple merchants who have joined the platform. Customers engage in conversation within a single dialogue box (e.g., dialogue UI 104), without the need to switch dialogue boxes. When a customer expresses a product demand to the first-layer platform in the dialogue box, the platform selects and recommends suitable merchants and products. Once the customer selects a merchant and product, the LLM in the dialogue box automatically transitions from representing the platform to representing the chosen merchant from the second layer. Although the dialogue box remains the same, it now operates within the system of the second-layer LLM indicated as 126, which represents the selected merchant in the second layer. The second-layer system 126 can include an AI module 128 for the selected merchant. The second-layer system 126 can further include includes databases for storing private knowledge (e.g., a vector database 130 for the selected merchant and an OLTP database for the selected merchant) and an order processing system 134 for the selected merchant. The working mechanism of the second-layer system 126 is similar to that of the first layer.

Figure 2A:
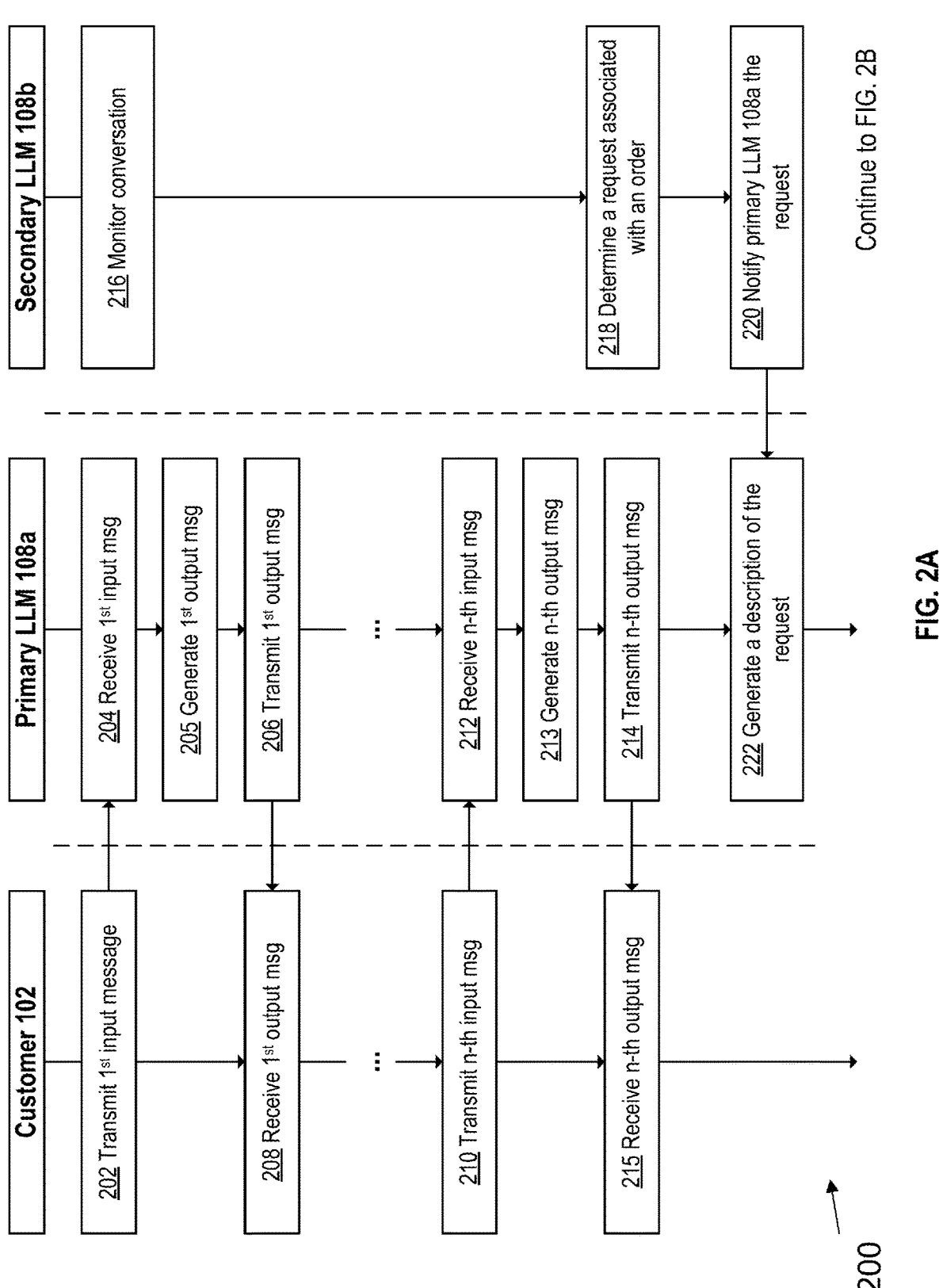
FIGS. 2A-2B illustrate a swimlane diagram of example interactions between a customer and different modules of the system of FIG. 1, according to some aspects of the present disclosure.
Figure 2B:
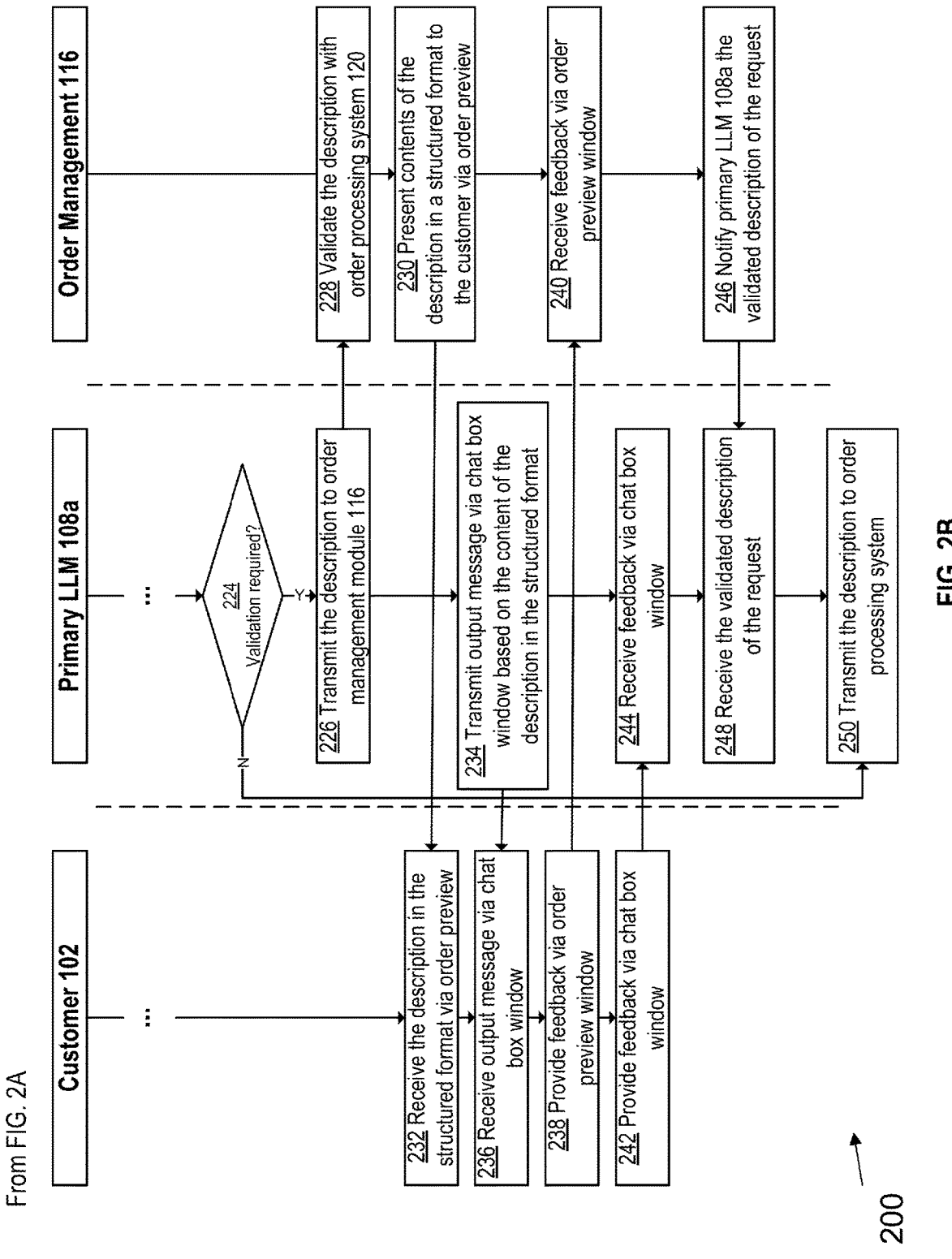

FIGS. 2A-2B illustrate a swimlane diagram 200 of example interactions between a customer and different modules of system 100 of FIG. 1, according to some aspects of the present disclosure.

System 100 can serve as an AI agent or an AI customer service of a merchant. The merchant can be any suitable merchant such as a restaurant, a hotel, or a retail store. System 100 can present dialogue UI 104 to the customer (e.g., customer 102 of FIG. 1). The customer can transmit input messages to system 100 and receive output messages from system 100 through a chat box window (e.g., chat box window 601 of FIG. 6) of dialogue UI 104. As shown in FIG. 2A, at 202, the customer transmits the first input message to system 100. At 204, primary LLM 108a receives the first input message. The first input message can be routed to primary LLM 108a through dialogue UI 104 and dialogue processing module 106 of system 100. At 205, primary LLM 108a can generate the first output message in response to the received first input message. In some implementations, Primary LLM 108a can generate the first output message based on content of the first input message and business information of the merchant (e.g., business information or private domain knowledge stored in OLTP database 114 and vector database 112). For example, primary LLM 108a can process the private domain knowledge as described with respect to FIG. 3. At 206, primary LLM 108a can transmit the first output message to the customer (e.g., through dialogue processing module 106 and dialogue UI 104). Primary LLM 108a may receive multiple input messages from the customer and may generate and transmit multiple output messages to the customer (e.g., as shown in 210, 212, 213, 214, and 215 of FIG. 2A). While FIG. 2A shows that primary LLM 108a generates one output message for each input message, it is understood that in some implementations, primary LLM 108a can generate one output message in response to multiple input messages or generate multiple output messages in response to one input message.

Each of the one or more input messages and the one or more output messages is either a natural language text message or a natural language voice message. When the customer submits voice messages, text/speech conversion model 122 of system 100 can be configured to convert an input voice message to an input text message and convert an output text message to an output voice message as described later with respect to FIG. 7.

In some implementations, system 100 supports a multi-language capability. That is, input messages and output messages can be in different natural languages. For example, the input messages can be in Spanish, while the output messages are in English. A procedure for the multi-language capability is described with further details with respect to FIG. 8

At 216, secondary LLM 108b can monitor a conversation between the customer and primary LLM 108a. The one or more input messages and the one or more output messages can be routed to secondary LLM 108b through, for example, dialogue UI 104 and dialogue processing module 106.

At 218, secondary LLM 108b can determine, based on the one or more input messages and the one or more output messages, that the customer has submitted a request associated with an order with the merchant. For example, secondary LLM 108b can determine or identify which message or sentence in the conversation related to placing or modifying an order. Mechanisms to identify the sentence related to the order are described with further details with respect to FIG. 4.

At 220, secondary LLM 108*b* can notify primary LLM 108*a* that the customer has submitted the request associated with the order.

At 222, upon receiving notification from secondary LLM 108*b*, primary LLM 108*a* can generate a description of the request in a format in compliance with an order processing system (e.g., order processing system 120 of FIG. 1) of the merchant. The notification from secondary LLM 108*b* can trigger the "function call" feature of primary LLM 108*a*, which allows primary LLM 108*a* to extract formatted data (e.g., the description of the request) from the conversation as parameters and pass the formatted data to a designated API or a designated module. The description of the request can include details associated with the order. In some implementations, the description can be in the JSON format.

At 224, primary LLM 108*a* can evaluate whether validation of the description of the request is required. If primary LLM 108*a* determines that no validation is required, primary LLM 108*a* can transmit the description to the order processing system at 250.

Otherwise, in response to determining that validation is required, at 226, primary LLM 108*a* can transmit the description to order management module 116 of system 100.

At 228, order management module 116 can validate the description with order processing system 120. For example, order management module 116 can communicate with order processing system 120 to verify that whether the format of the description is supported by order processing system 120. In another example, order management module 116 can verify some order details (such as availability of an item or a service in the order) in the description with order processing system 120.

Furthermore, order management module 116 can validate the description with the customer. At 230, order management module 116 can present contents of the description in a structured format to the customer. In some implementations, order management module 116 can present the description via an order preview window (e.g., order preview window 603 of FIG. 6) of dialogue UI 104 to the customer.

At 232, the customer receives the description in the structured format.

At 238, the customer can provide feedback on the description by confirming or making changes to the order via the order preview window. The feedback from the customer can be transferred to order management module 116 through dialogue UI 104 and dialogue processing module 106.

At 240, order management module 116 can receive the feedback from the customer via the order preview window.

In some implementations, the chat box window and the order preview window of dialogue UI 104 can interact with each other. Primary LLM 108*a* can explain contents in the order preview window by transmitting an output message in natural language in the chat box window (e.g., at 234). For example, if the customer orders a dish in the order preview window, primary LLM 108*a* can transmit a message to the customer in the chat box window: "You have ordered a dish. Here is your current order."

At 236, the customer can receive the output message via the chat box window.

At 242, the customer can provide feedback in natural language via the chat box window.

At 244, primary LLM 108*a* can receive the feedback in natural language from the customer via the chat box window. In some implementations, At 246, order management module 116 can notify primary LLM 108*a* the validated description of the request.

At 248, primary LLM 108*a* receives the validated description of the request.

At 250, primary LLM 108*a* transmits the description to the order processing system (e.g., order processing system 120 of FIG. 1).

Figure 6:
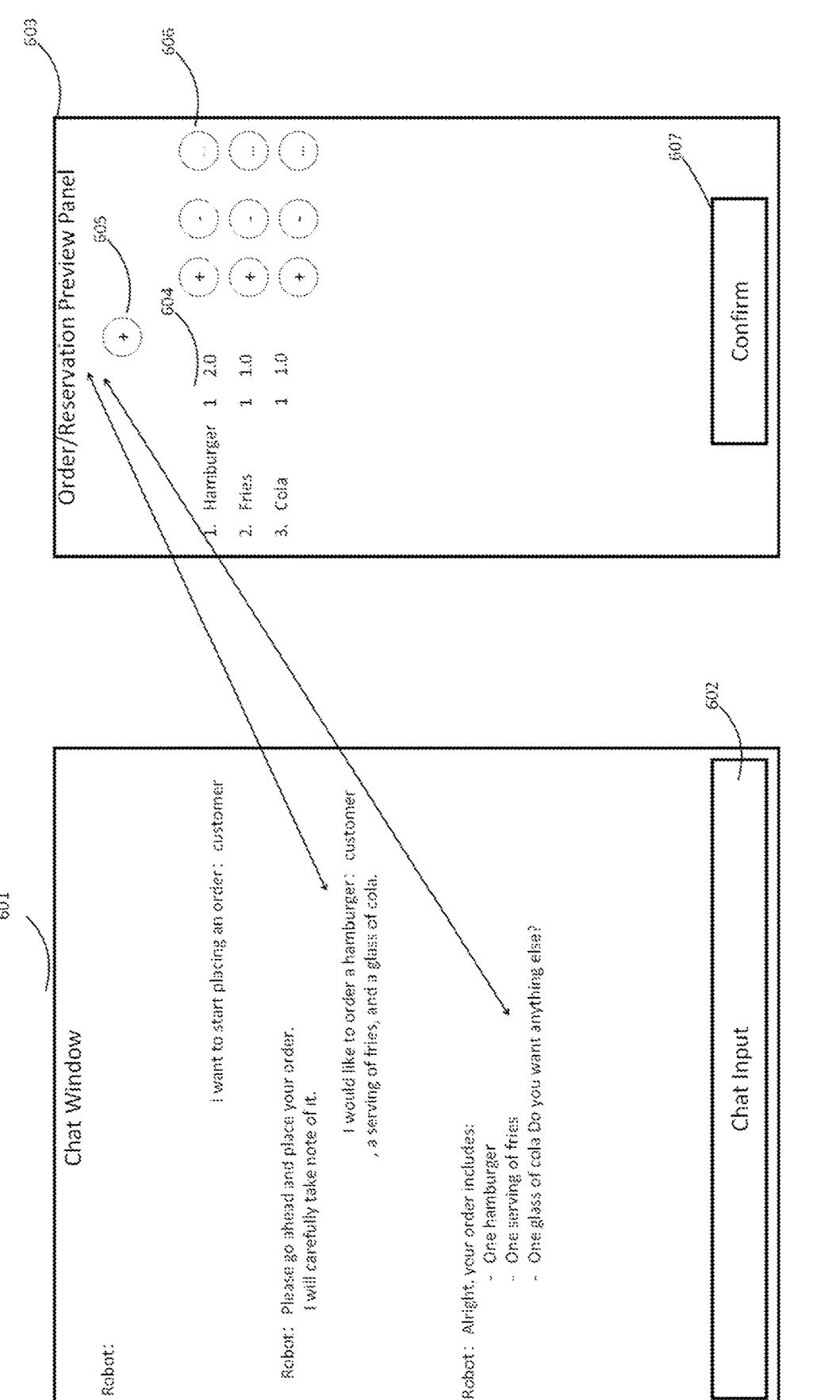
FIG. 6 illustrates an example of a dialogue user interface (UI) of FIG. 1, according to some aspects of the present disclosure.

Further details of an order validation process through the chat box window and the order review window of dialogue UI 104 are described with respect to FIG. 6.

GPT and other LLMs can be trained on trillions of tokens and already contain a vast amount of knowledge from encyclopedias, web pages, and e-books. They are able to converse with users based on this knowledge.

However, in some implementations, when using LLMs for customer service of a merchant (or business), it may be necessary to handle the business's domain knowledge separately. This includes information such as the business's contact details, business's introduction, products and services information, availability information, and other related business details. This proprietary knowledge exists in the business's server file system or database. When building a customer service chatbot based on LLMs, this knowledge can be processed so that the LLM can engage with users based on this information.

Figure 3:
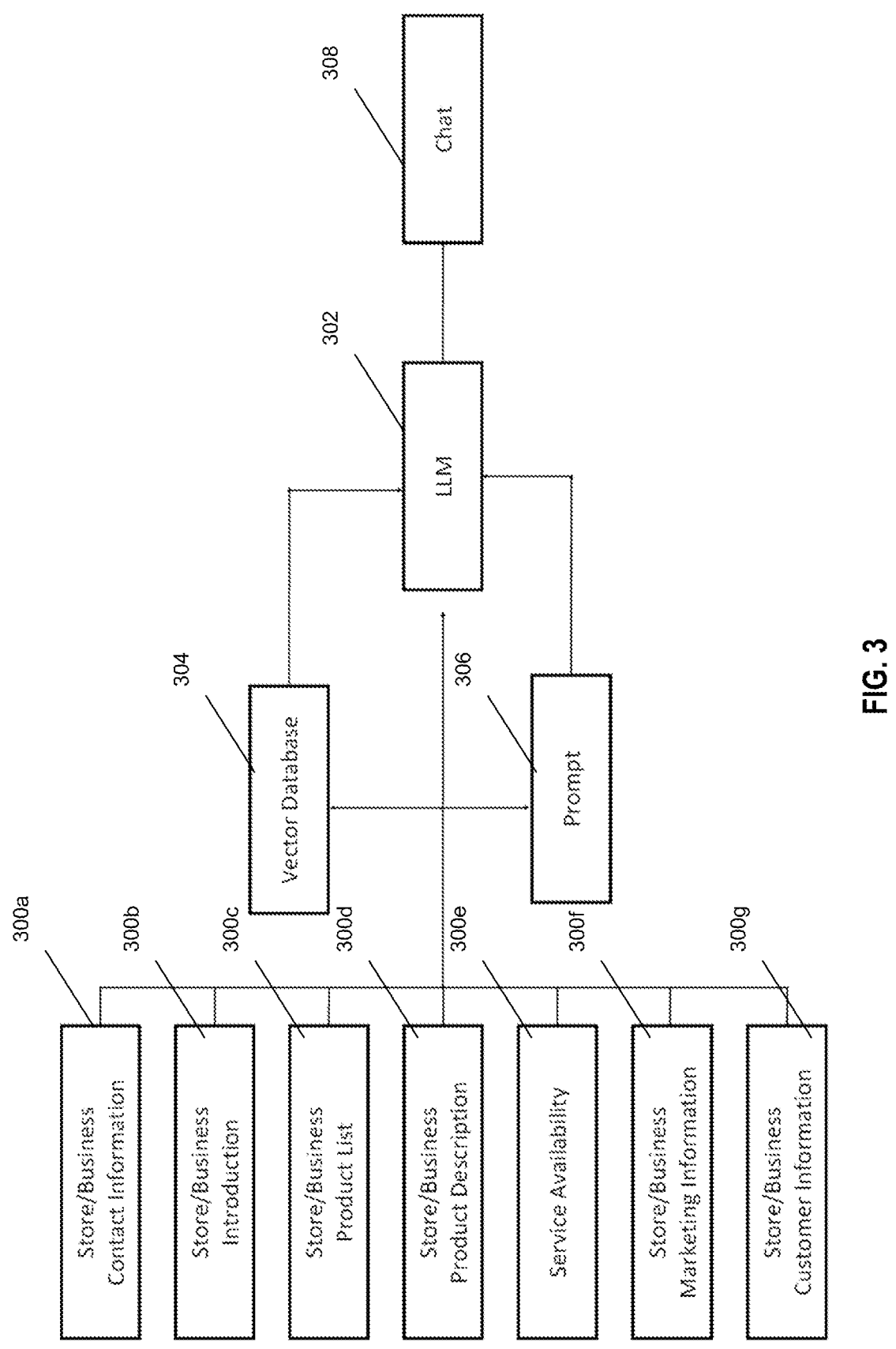
FIG. 3 illustrates example knowledge processing methods, according to some aspects of the present disclosure.

FIG. 3 illustrates example knowledge processing methods, according to some aspects of the present disclosure.

The types of knowledge that may be processed include the following: business's contact information (e.g., 300*a* of FIG. 3, which could be structured data in a database or unstructured text data); business's introduction (e.g., 300*b*, which is in text data format); business's product list (e.g., 300*c*, including items, modifiers, pricings, specials, and all related, which in most cases is structure data in a database, but could also be unstructured text data); business's product descriptions (e.g., 300*d*, which are text data); business's service information (e.g., 300*e*, such as table, resource, labor, or other timeslot availability, including staff availability and labor requirements, which in most cases is structured data in a database, but could also be unstructured text data); business's marketing information (e.g., 300*f*, such as discounts, promotions, and events, which is usually structured data in a database, but could also be unstructured text data); or business's customer list, customer history, customer relationship information (e.g., 300*g*, which typically is structured data in a database, but could also be unstructured text data).

Structured data can be data that is organized and has a standardized format for efficient access. Structured data can be managed by a relational database tool using programming language such as structured query language (SQL). In some implementations, structured data can be stored in tabular format, and different rows and columns in the tabular format can represent different attributes of the structured data. On the other hand, unstructured data may not have a predefined model or a standardized format. For example, a Wikipedia page or a social media post can be unstructured data.

As shown in FIG. 3, the processing of this domain knowledge can be done using at least three methods based on different situations. For text-based information, the embedding feature of a LLM 302 is used to convert the text into vectors, which are then stored in a vector database 304. In some implementations, LLM 302 can be an example of LLMs 108a-108n of FIG. 1, and vector database 304 can be an example of vector database 112 of FIG. 1.

In some implementations, when the amount of domain knowledge is relatively small, LLM's Prompt can be directly utilized. In each conversation, the System Prompt 306 of LLM 302 can includes the domain knowledge.

If supported by the LLM, the knowledge can be sent directly to LLM in a conversation or chat 308. This knowledge could be in the form of text files or JSON files obtained by querying a database through a database interface.

The technology foundation of the LLM is the "neural network", which means that for the LLM, knowledge and conversations are based on probabilities calculated by the neural network parameters. However, in the service industry, business data such as orders are expected to be accurate and error-free. The LLM can easily engage in conversations with users, but how to extract and organize structured order, reservation, and scheduling data from the conversation is a challenge addressed by techniques describe in this disclosure.

First of all, some LLMs like GPT offers a "function call" feature, where the LLM can extract formatted data from the conversation as parameters and pass them to the designated API. This "function call" can be used to establish a connection between the LLM and the order management process.

For LLMs that do not have the "function call" feature, the "entity recognition" capability of the LLM can be utilized. This enables the LLM to extract order, reservation, or scheduling data, including but not limited to product names, quantities, prices, and booking details, from a conversation and generate JSON data.

One challenge in order capture is determining when to trigger the "function call." Specifically, it is necessary to identify which sentence in the conversation needs to execute the "function call," i.e., a mechanism is needed to determine which statement is related to placing or modifying an order, and booking or modifying a reservation or scheduling.

Figure 4A:
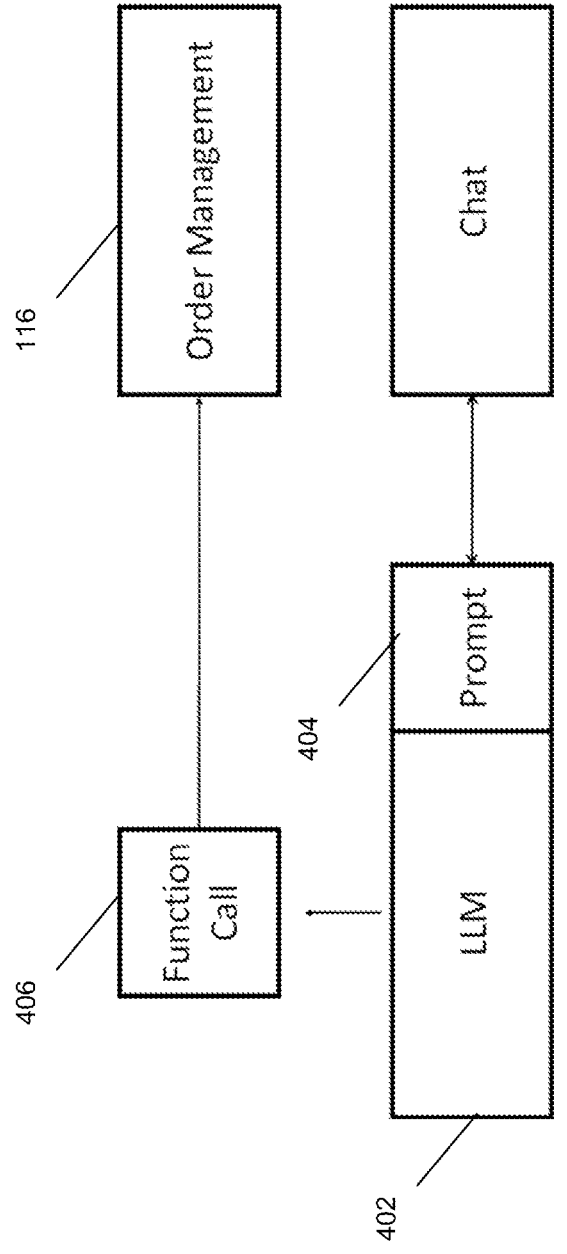
FIGS. 4A-4B illustrate example mechanisms for order identification, according to some aspects of the present disclosure.
Figure 4B:
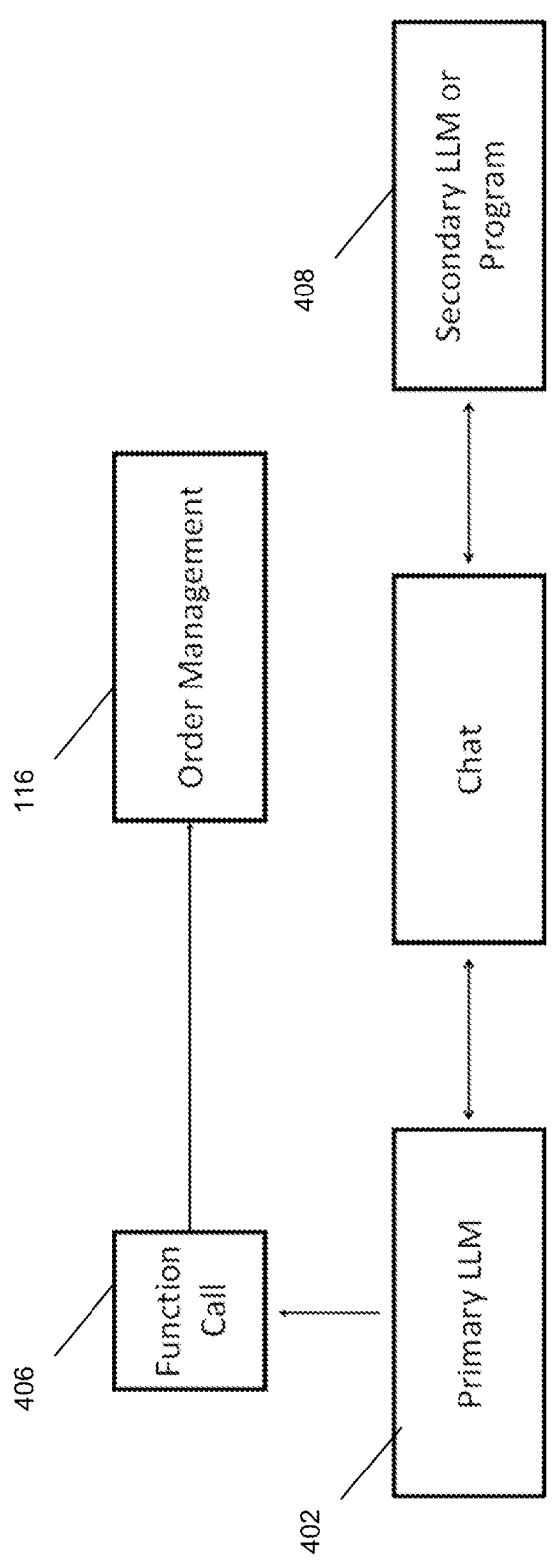

FIGS. 4A-4B illustrate example mechanisms for order identification, according to some aspects of the present disclosure. These mechanisms can determine or identify whether a sentence or a message in a conversation between a customer and the AI agent is related to placing or modifying an order, and booking or modifying a reservation or scheduling.

As shown in FIG. 4A, one approach is to let LLM 402 make the judgment independently by specifying it in the System Prompt 404. In some implementations, LLM 402 can be primary LLM 108a of FIG. 1 or any other LLMs that is suitable for this task. For example, a sentence can be added to the System Prompt 404:

"When a customer places an order, the 'update_order' function needs to be called to update the customer's selected dishes in the real-time ordering system."

The LLM 402 will then autonomously identify the ordering information from the customer's conversation and automatically invoke the "Function Call" feature 406. It will parse the order details, generate JSON data, and indicate the "call" of the update_order function. In some implementations, the LLM 402 (e.g., LLM 108a of FIG. 1) can include an LLM and an interface program. The LLM can be any suitable LLM (e.g., a remote public LLM or a locally deployed private LLM). The interface program is configured to handle interactions between an exterior module and the LLM. For example, the interface program can perform configuration of a software development kit (SDK) or an API of the LLM. The interface program can include system prompts, which can be either static content or content that are dynamically generated by the prompt management database 124 of FIG. 1. The system prompts can include natural language information and can inform the LLM how to make a function call so that the LLM 402 can automatically call external functions (e.g., order processing API 118 of FIG. 1). Furthermore, the interface program may define the function call by specifying parameters to be parsed and passed to an external function by the LLM, as well as a name of the function to be executed. The interface program can be implemented using any suitable programming language (e.g., Python). The interface program can use the information generated by the LLM 402 to call a preconfigured API (e.g., order processing API 118 of FIG. 1) of the real-time ordering system (e.g., order processing system 120 of FIG. 1). In some implementations, the generated information can be transmitted to order management module 116 for validation.

As shown in FIG. 4B, another approach is to set up a separate secondary LLM 408 to monitor the conversation between LLM 402 and the user. Secondary LLM 408 can be, for example, secondary LLM 108b of FIG. 1. If secondary LLM 408 detects the presence of order information, it notifies the interface program, which in turn notifies LLM 402 to execute the "Function Call" feature 406 and specifies the invocation of the update_order function. This triggers order parsing, JSON data generation, and passing of data to the preconfigured API (e.g., order processing API 118 of FIG. 1) for execution.

GPT and other similar LLMs differ from previous language models in one important aspect: they are multimodal. Through prompts in conversation, they can be guided to perform various tasks, making prompts a convenient way for fine-tuning the model. Setting appropriate prompts is useful for the effective functioning of LLMs. Prompts are usually categorized into three types: System Prompt, Assistant Prompt, User Prompt, with the System Prompt being the one that needs to be set in advance.

Figure 5:
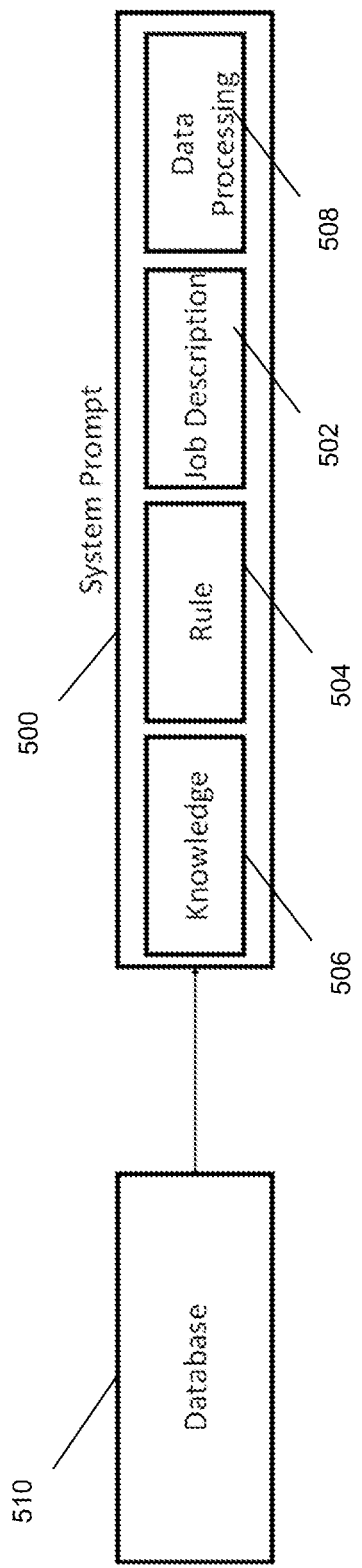
FIG. 5 illustrates an example structure of a system prompt.

FIG. 5 illustrates an example structure of a System Prompt 500. For dialogue AI systems used in the service industry, the System Prompt 500 includes four elements. The first element is Job Description 502. Job Description 502 informs the LLM about the specific role it needs to fulfill, such as being a restaurant server, a translator, or a scheduler. The second element is Rules 504. Rules 504 refer to guidelines that inform the LLM about the rules it should follow while performing its job. For example, "After a customer places an order, repeat the ordered dishes and ask if they need anything else." The third element is Knowledge 506. Knowledge 506 includes injecting the necessary knowledge into the LLM. For instance, providing information about dishes and their prices or giving an introduction to a particular dish. Much of this knowledge, such as recipes, already exists in business' commercial systems such as POS or retail system, so when using prompts, the program calls such systems' databases 510 (e.g., vector database 112 and OLTP database 114 of FIG. 1) to retrieve this knowledge to maintain consistency. The fourth element is Data Processing 508, which can refer to how data is processed by the model. For example, having the LLM generate a JSON file based on the dishes ordered by the customer.

An example prompt is provided as follows.

——————— Job Description ———————

Your role is named Ellie, and you are a server at "'+restaurant.RESTAURANT_NAME+'" restaurant. Ellie is known for being extremely honest and never telling lies. She loves her job and always enjoys providing excellent service to customers. She is patient and dedicated, and it brings fulfillment to her life. Please remember that she is a restaurant server.

——————— Rule ———————

Restaurant server guidelines:

1. Only dishes from the restaurant menu can be offered. The restaurant will only provide dishes listed on the menu, and dishes not included in the menu cannot be provided.
2. If dishes have the same name but different sizes, for example: Coke (Large), Coke (Medium), Coke (Small), and the customer does not specify the size, ask the customer which size they would like.
3. It is necessary to proactively showcase or recommend some dishes to customers. When taking orders, if a certain dish or dish name is not listed on the menu, ask the customer if they are interested in a similar dish listed on the menu. When the customer's conversation is related to the price of a dish, refer to the price of that dish on the menu. If the customer's conversation is unrelated to ordering, guide the conversation back to ordering.
4. When the customer is placing an order, when responding to the customer, say "This is your order" and repeat the dishes that the customer has ordered, listing all the dishes including the dish name, quantity, and price. Finally, ask the customer "Do you need anything else?" and "Are you confirming the order?".
5. If the customer confirms the order, inform the customer "Your order has been confirmed, the order is as follows" and list the dishes ordered again, including the dish name, quantity, and price. Finally, inform customer "Your order has been submitted."

——————— Data Processing ———————

6. Please provide the complete list of dishes in standard double quotation JSON format.

——————— Knowledge From Database ———————

Restaurant menu (dish name, dish price, dish category)::
   '"'+getMenuList ( )

The LLM is a language model that interacts in the form of a conversation. Users send messages in natural language to the LLM, and the LLM responds with natural language or other results. However, even if the returned result is a formatted data, such as an order in a strictly compliant JSON format as requested by the user, it does not represent a user's strict and conformed business transactional commitment.

The present disclosure provides techniques for designing a method to generate strictly formatted orders that represent business commitments that results in a business transaction based on natural conversations between users and the LLM. This method should also be simple and clear for users.

FIG. 6 illustrates an example of dialogue UI 104 of FIG. 1, according to some aspects of the present disclosure. As shown in FIG. 6, dialogue UI 104 includes a chat box window 601 and an order preview window 603. The chat box window 601 displays the dialogue exchange between users and the LLM (e.g., primary LLM 108a of FIG. 1). A chat input box 602 is provided so that users can enter their input here. The order preview window 603 displays the business commitments generated during the dialogue exchange, such as orders, reservations, and schedules. In some implementations, the business commitments can refer to the expected end result of a business transaction, such as the actual order, reservation, or schedule that would have been committed into the underlying business management system. The order preview window 603 can also perform formatting operations directly.

The order preview window 603 includes one or more line items 604 in the order, which can be customized according to the requirements of service industry business orders. Operation button 605 in the order preview window 603 can provide user a manual button to invoke for actions such as "Submitting the Order." Alternatively, operations can also be carried out via conversations with LLM through dialogue (e.g., through the chat box window 601). Operations 606 for line items in the order include adding quantity, reducing quantity, and showing details. Alternatively, line item operations can also be requested through conversations with LLM through dialogue (e.g., through the chat box window 601). The order preview window 603 further includes a confirm button 607, which can be used when the user decides to end the process of placing an order and completes and confirms the order. Alternatively, this can also be carried out via conversations with LLM through dialogue (e.g., through the chat box window 601).

One characteristic of this interactive interface design is that the conversation window and the order/reservation/ scheduling preview panel, on the left and right respectively, interact with each other. The order/reservation/schedule content confirmed in the conversation window can be displayed in real-time in the order/reservation/scheduling preview panel on the right. If the user directly interacts in the order/reservation/scheduling preview panel, such as ordering dishes or confirming, the LLM will explain these actions in natural language in the dialogue box. For example, if the user orders a dish in the order/reservation/scheduling preview panel, the LLM in the conversation window will say: "You have ordered a dish. Here is your current order."

Figure 7:
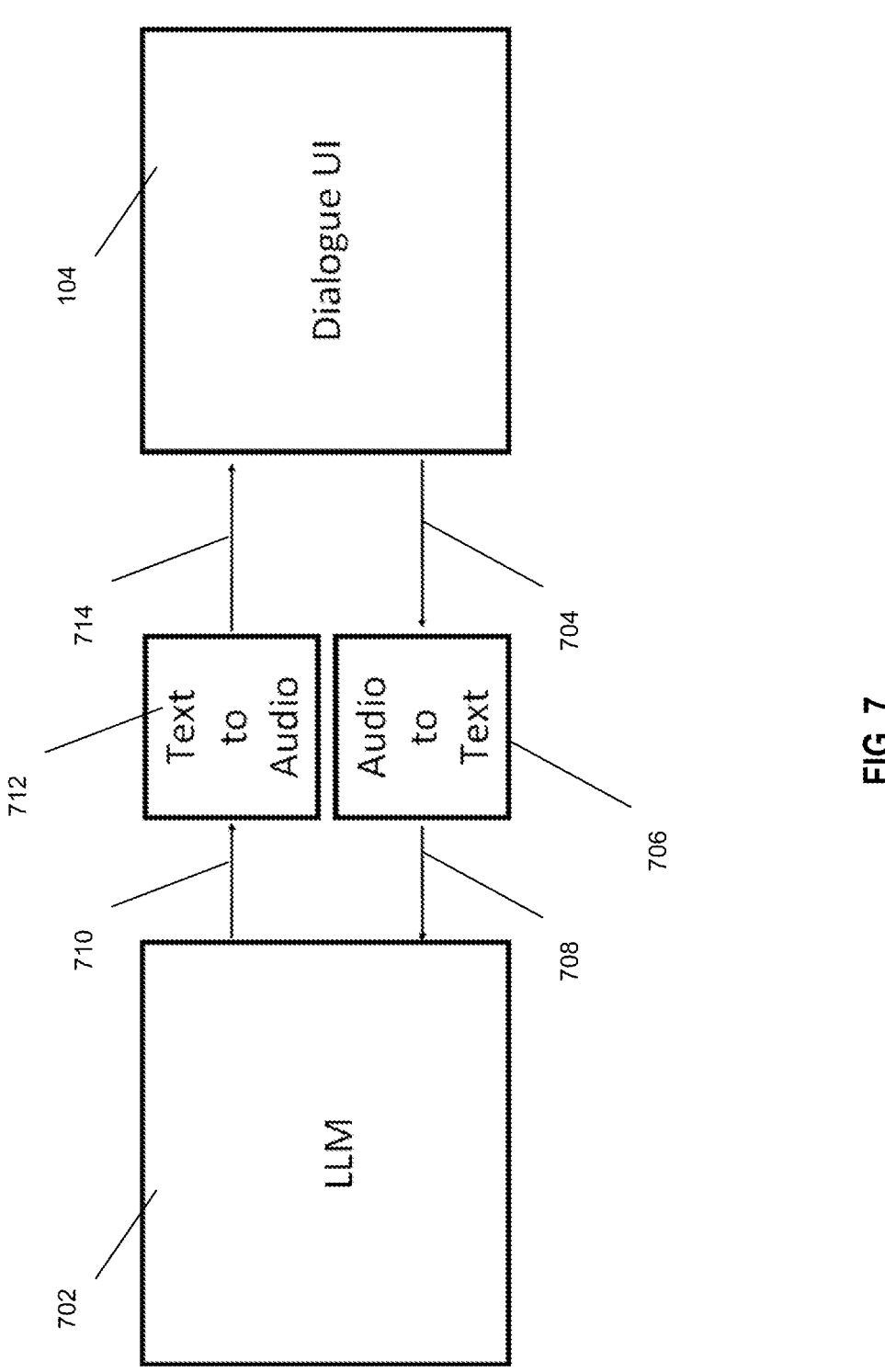
FIG. 7 illustrates an example processing flow of a voice conversation, according to some aspects of the present disclosure.

FIG. 7 illustrates an example processing flow of a voice conversation, according to some aspects of the present disclosure. A dialogue between a LLM 702 (e.g., primary LLM 108a of FIG. 1) and a user (e.g., customer 102 of FIG. 1) can be supported in two ways: text input and voice conversation (where users input their voice). As shown in FIG. 7, a voice input message 704 in dialogue UI 104 is first passed to an audio to text model 706. Audio to text model 706 converts voice input message 704 into a text input message 708, which is then passed to the LLM 702. The following process is the same as inputting text. Feedback from the LLM is also transmitted in text format (a text output message 710). After various processing steps, when being displayed in the dialogue UI 104, text output message 710 is converted into voice output message 714 using a text to audio model 712.

The LLM can have multi-language capabilities, which means it can understand various human languages it supports and can freely converse with users in the supported human languages. Users can request the desired human language mode for the conversation in the dialogue box.

For example, a user can request, "I am using Language A, please respond in Language B.", or user can simply converse in the human language of their choice. The LLM can infer the human language and reply with the same human language in kind.

It can be challenging to handle the merchant's domain knowledge, such as product listings, stored in their local database using the local language. When the large model processes user order requests and references products, it can align with the local language in the database to accurately place the order.

Figure 8:
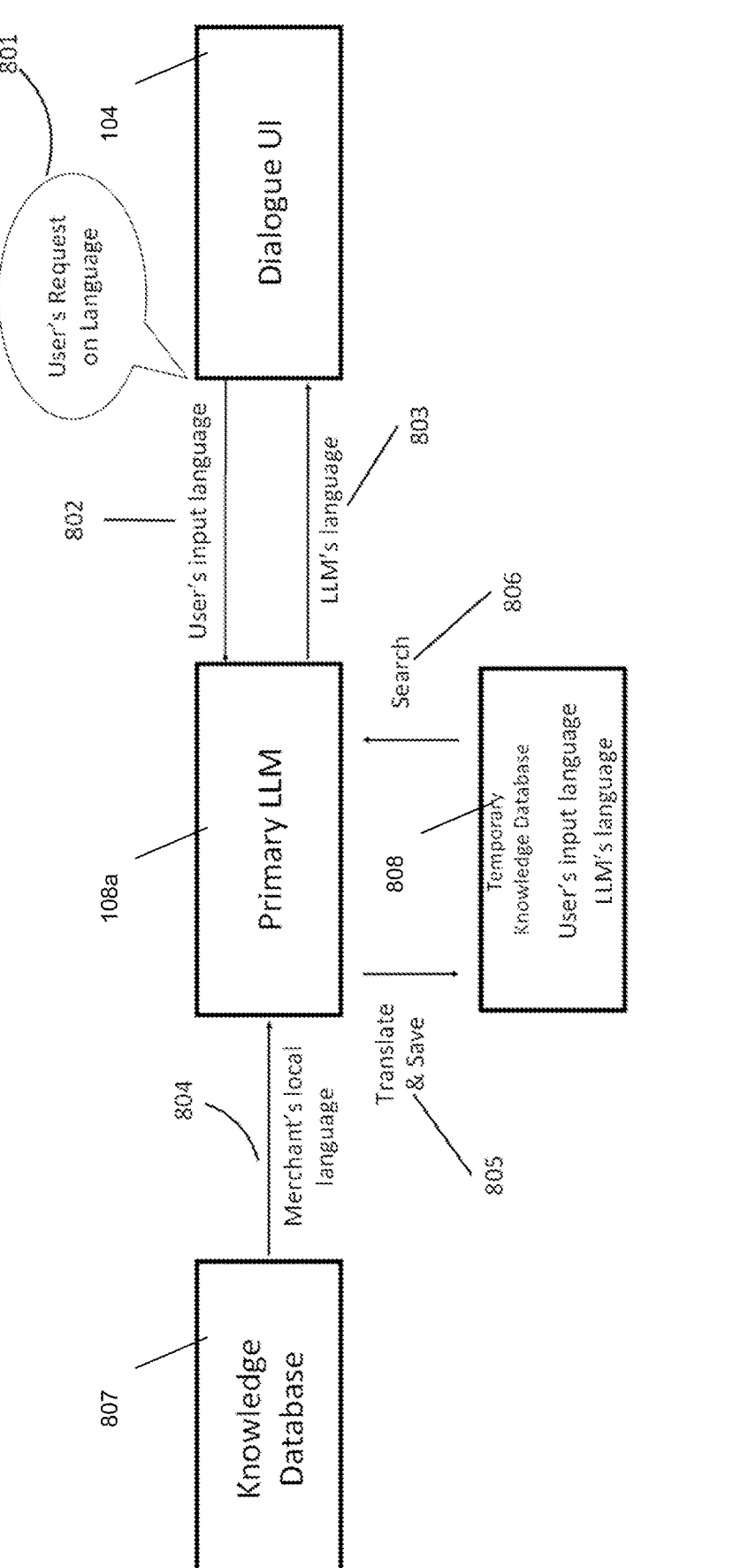
FIG. 8 illustrates a diagram showing an example method to support multi-language capability, according to some aspects of the present disclosure.

FIG. 8 illustrates a diagram 800 showing an example method to support multi-language capability, according to some aspects of the present disclosure. The method can be performed, for example, by system 100 of FIG. 1. Diagram

800 includes a temporary database that translates the knowledge information from the merchant's database into the target language based on the user's language requirements. Diagram 800 can be utilized in an order service process.

At 801, user's request can be used by users to make language requests to primary LLM 108a during a conversation. In some implementations, a user can request, "I am using Language A, please respond in Language B." or can converse in their desired language, and LLM infers the language and responds in kind.

At 802, user's input language can be a language used by users input or speak in the dialogue UI 104.

At 803, primary LLM 108a responds in a language based on the user's request. Usually, the user's language and the LLM's response language are consistent, but it is also possible for them to be different based on user requests.

At 804, the knowledge stored in the merchant's local database 807 (e.g., vector database 112 and OLTP database 114 of FIG. 1), such as product information, may be in the local language and different from the two languages mentioned in 802 and 803.

At 805, after a user makes a language request in 801, primary LLM 108a translates the knowledge database into two versions, namely Language A and Language B, and saves them in a temporary database 808. In temporary database 808, the product information in the two temporary languages is associated with the product information in the local language.

At 806, during the ordering process, when the user mentions product information in different languages, the LLM searches the temporary database. As such, the translation is performed once within a single conversation, thereby ensuring consistency in the product information.

Techniques in this disclosure can utilize a computer system supported by an AI LLM to replace humans and provide services to customers in the service industry. These services include providing customers with various information, explaining products, and handling the order/reservation/scheduling process for customers, accurately generating order/reservation/scheduling based on customer language requirements.

Techniques described in this disclosure can achieve one or more of the following benefits.

The techniques can improve quality of service and experience by providing customers a natural way to interact with the store, as if conversing with a real person.

The techniques can significantly reduce input errors and save time as well as costs from human operations through complete autonomous AI agents, where customer interactions can be serviced promptly and speedily without delay regardless of scale.

The techniques can place a human touch to the business operations (such as orders, reservations, and scheduling) via verbal or written natural conversations, without actual human actors intervening, thus autonomously handling business operations accurately without delay and labor costs. Saving merchants time and money, providing customers better satisfaction and gratification.

The techniques can lead to autonomous handling of business tasks without presenting a traditional structured input form. Traditional structured business forms at times makes customers feel un-natural and cold due to lack of human interactions. Offering customers to naturally converse with merchant's business in a human-like interaction for business processes helps increase customer to merchant relational success.

There can be less human language restrictions in the techniques described in the present disclosure. Users can choose to have conversations in human languages supported by the LLM, and they can also request the LLM to respond in a specific human language. The human language in the merchant's database can also be different. It is a cross-lingual conversational AI that can be used for ordering, reservation, and scheduling, just like what a real-life translator performs.

The techniques can lead to a reliable architecture. A mature and readily usable technical architecture based on LLMs has been developed. With the current level of capability of LLMs, this architecture is capable of generating commercial commitments such as orders or reservations during conversations, with a high level of accuracy.

The techniques can lead to convenient construction of private knowledge base. In some instances, there may be no need to train and fine-tune the LLM. Instead, a comprehensive private knowledge base is built using relational databases, file systems, vector databases, and Prompt libraries. This approach not only protects user data privacy but also saves on GPU hardware costs required for model training. Additionally, the deployment of this approach is very straightforward and easy.

Multi-LLM design in the techniques can ensure accuracy. The task allocation mechanism among multiple LLMs provides assurance in capturing correct order information during conversations and ensuring accurate submissions. This is a highly effective method to improve order accuracy.

The techniques can provide carefully designed mechanism to strictly maintain consistency between free-form conversation and formatted data. The formatted order/reservation management module and the LLM tracking order in natural language conversations interact in real-time. This design further enhances the accuracy of order generation during conversations.

The techniques can provide a newly designed interactive interface that combines AI conversation with precise formatted orders. The dialogue window and the order/reservation preview panel are presented side by side, allowing for interactive engagement. The content of the conversation and the formatted data remain consistent, giving users the freedom to choose between dialogue or interface interactions. This flexible and user-friendly interaction method greatly enhances the user experience.

The techniques can bring support for multiple conversation formats and multiple languages. During a conversation, users have the freedom to choose between inputting text or using voice, as well as selecting the desired language. The system's support for dialogue formats and languages makes the interaction extremely convenient and user-friendly.

Techniques described in the present disclosure can be used in restaurants, hotels, retailers to provide autonomous customer service, order and reservation services. They can be integrated into the following applications: the restaurant management system (for store info, product info, orders, and reservations); the hotel management system (such as hotel info, room service info, room service orders, reservations); the retail shop management system (such as retailer info, products and services info, orders, booking or appointments); online order and online reservations; ecommerce website; business/company's website; business/company's labor scheduling; general informational AI service agents (AI service chatbots); or run independently as an app or web service to provide related services.

Embodiments of the subject matter and the operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification, the different functions can be implemented using "engines," which broadly refer to software-based systems, subsystems, or processes that are programmed to perform one or more specific functions. Generally, an engine is implemented as one or more software modules or components, installed on one or more computers, in one or more locations. In some cases, one or more computers can be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing models described in this specification can also include, for example, special-purpose hardware accelerator units for processing common and compute-intensive parts of machine learning training or production, i.e., inference, workloads. Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any disclosure or on the scope of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claim in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described in this specification. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, comprising:
receiving, by a first large language model (LLM) implemented by one or more processors, one or more input messages from a user device via a dialogue user interface (UI);

generating, by the first LLM, one or more output messages based on the one or more input messages and information of a provider;
transmitting the one or more output messages to the user device via the dialogue UI;
monitoring, by a second LLM implemented by the one or more processors, (i) the one or more input messages received from the user device and (ii) the first LLM, the monitoring comprising determining, by the second LLM, that the user device has submitted a request associated with an order with the provider by identifying a particular input message in the one or more input messages related to the order;
notifying the first LLM, by the second LLM, of the identified particular input message, wherein the notification triggers a function call feature of the first LLM, the function call feature causing the first LLM to extract order data from the one or more input messages;
generating, by the first LLM, a description of the request in a format in compliance with an order processing system of the provider using the extracted order data;
transmitting the description to the order processing system through an order processing application programming interface (API); and
validating the format by the order processing system in response to receiving the formatted description through the order processing API.

2. The method according to claim 1, wherein the dialogue UI comprises a chat box window and an order preview window that are configured to interact with each other, and wherein the one or more input messages and the one or more output messages are presented in the chat box window.

3. The method according to claim 2, comprising:
presenting, via the order preview window, contents of the description in a structured format to a user;
receiving feedback from the user on the contents of the description through at least one of the chat box window or the order preview window; and
validating the contents of the description based on the feedback.

4. The method according to claim 3, wherein the format of the description and the contents of the description are validated by a third LLM.

5. The method according to claim 1, wherein the request comprises one or more of:
a request from the user device to place a new order with the provider;
a request from the user device to modify an existing order the user device placed with the provider previously; or
a request from the user device to cancel the existing order.

6. The method according to claim 1, wherein the order comprises one or more of:
an order for a good being sold by the provider; or
an order for a service being provided by the provider.

7. The method according to claim 1, wherein each of the one or more input messages and the one or more output messages is either a natural language text message or a natural language voice message.

8. The method according to claim 1, wherein:
the information is stored in a local knowledge database that is accessible to the first LLM; and
the information comprises one or more of:
contact information of the provider;
an introduction to the provider;
a list of products sold by the provider;

a product description;

availability information of services provided by the provider;

marketing information; or information of users of the provider.

9. The method according to claim 8, wherein:

the one or more input messages and the one or more output messages are in a first natural language;

the information is stored in the local knowledge database in a second natural language; and the method further comprises:

generating the information in the first natural language; and storing the information in the first natural language in a second local knowledge database that is accessible to the first LLM.

10. The method according to claim 1, wherein the first LLM is a public LLM, and wherein the second LLM is a private LLM trained using training data associated with the information of the provider.

11. A system comprising:

one or more computers; and one or more storage devices storing instructions that when executed by the one or more computers cause the one or more computers to perform operations comprising:

receiving, by a first large language model (LLM) implemented by one or more processors, one or more input messages from a user device via a dialogue user interface (UI);

generating, by the first LLM, one or more output messages based on the one or more input messages and information of a provider;

transmitting the one or more output messages to the user device via the dialogue UI;

monitoring, by a second LLM implemented by the one or more processors, (i) the one or more input messages received from the user device and (ii) the first LLM, the monitoring comprising determining, by the second LLM, that the user device has submitted a request associated with an order with the provider by identifying a particular input message in the one or more input messages related to the order;

notifying the first LLM, by the second LLM, of the identified particular input message, wherein the notification triggers a function call feature of the first LLM, the function call feature causing the first LLM to extract order data from the one or more input messages;

generating, by the first LLM, a description of the request in a format in compliance with an order processing system of the provider using the extracted order data;

transmitting the description to the order processing system through an order processing application programming interface (API); and validating the format by the order processing system in response to receiving the formatted description through the order processing API.

12. The system according to claim 11, wherein the dialogue UI comprises a chat box window and an order preview window that are configured to interact with each other, and wherein the one or more input messages and the one or more output messages are presented in the chat box window.

13. The system according to claim 12, the operations comprising:

presenting, via the order preview window, contents of the description in a structured format to a user;

receiving feedback from the user on the contents of the description through at least one of the chat box window or the order preview window; and validating the contents of the description based on the feedback.

14. The system according to claim 13, wherein the format of the description and the contents of the description are validated by a third LLM.

15. The system according to claim 11, wherein the request comprises one or more of:

a request from the user device to place a new order with the provider;

a request from the user device to modify an existing order the user device placed with the provider previously; or a request from the user device to cancel the existing order.

16. The system according to claim 11, wherein the order comprises one or more of:

an order for a good being sold by the provider; or an order for a service being provided by the provider.

17. The system according to claim 11, wherein each of the one or more input messages and the one or more output messages is either a natural language text message or a natural language voice message.

18. The system according to claim 11, wherein:

the information is stored in a local knowledge database that is accessible to the first LLM; and the information comprises one or more of:

contact information of the provider;

an introduction to the provider;

a list of products sold by the provider;

a product description;

availability information of services provided by the provider;

marketing information; or information of users of the provider.

19. The system according to claim 18, wherein:

the one or more input messages and the one or more output messages are in a first natural language;

the information is stored in the local knowledge database in a second natural language; and the operations further comprise:

generating the information in the first natural language; and storing the information in the first natural language in a second local knowledge database that is accessible to the first LLM.

20. One or more non-transitory computer-readable storage media storing instructions that when executed by one or more computers cause the one or more computers to perform operations comprising:

receiving, by a first large language model (LLM) implemented by one or more processors, one or more input messages from a user device via a dialogue user interface (UI);

generating, by the first LLM, one or more output messages based on the one or more input messages and information of a provider;

transmitting the one or more output messages to the user device via the dialogue UI;

monitoring, by a second LLM implemented by the one or more processors, (i) the one or more input messages received from the user device and (ii) the first LLM, the monitoring comprising determining, by the second LLM that the user device has submitted a request associated with an order with the provider by identifying a particular input message in the one or more input messages related to the order;

notifying the first LLM, by the second LLM, of the identified particular input message, wherein the notification triggers a function call feature of the first LLM, the function call feature causing the first LLM to extract order data from the one or more input messages;

generating, by the first LLM, a description of the request in a format in compliance with an order processing system of the provider using the extracted order data;

transmitting the description to the order processing system through an order processing application programming interface (API); and validating the format by the order processing system in response to receiving the formatted description through the order processing API.

\* \* \* \* \*